United States Patent [19]
Heep

[11] Patent Number: 5,778,731
[45] Date of Patent: Jul. 14, 1998

[54] RACK-AND-PINION GEAR

[75] Inventor: Theo Heep, Krefeld, Germany

[73] Assignee: TRW Inc., Lyndhurst, Ohio

[21] Appl. No.: 734,584

[22] Filed: Oct. 22, 1996

[30] Foreign Application Priority Data

Oct. 26, 1995 [DE] Germany .................. 195 39 864.5

[51] Int. Cl.⁶ .................... B62D 3/12; F16H 1/04
[52] U.S. Cl. .................... 74/498; 74/422; 384/255
[58] Field of Search .............. 74/422, 498; 384/255

[56] References Cited

U.S. PATENT DOCUMENTS

| | | | |
|---|---|---|---|
| 719,562 | 2/1903 | Brush | 384/255 |
| 3,820,415 | 6/1974 | Cass | 74/498 |
| 3,908,479 | 9/1975 | MacDuff | 74/498 |
| 4,218,933 | 8/1980 | Allen et al. | 74/422 |
| 4,614,127 | 9/1986 | Elser | 74/422 |
| 5,216,928 | 6/1993 | Kodachi | 74/422 |

FOREIGN PATENT DOCUMENTS

| | | |
|---|---|---|
| 2409038 | 10/1974 | Germany . |
| 2657289 | 6/1977 | Germany . |
| 2657290 | 6/1977 | Germany . |
| 2934275 | 3/1980 | Germany . |
| 4302309 | 8/1994 | Germany . |
| 1419082 | 12/1975 | United Kingdom .......... 74/498 |

OTHER PUBLICATIONS

European Search Report EP 96 11 6845.

*Primary Examiner*—Charles A. Marmor
*Assistant Examiner*—Troy Grabow
*Attorney, Agent, or Firm*—Tarolli, Sundheim, Covell, Tummino & Szabo

[57] ABSTRACT

In order to specify a rack-and-pinion gear having a gearbox case, in a drill hole of which is guided a steering rack (6) making contact via a pinion arranged in a pinion housing area (3), which is economical and simple to construct, does not have a tendency to chatter and guarantees an improved sealing with simultaneous simplification of the housing construction, it is proposed that the drill hole (7) be enlarged in an eccentric sense in the area where the pinion and steering rack mesh and for a wedge bearing element (10), substantially in the form of a sleeve, having at least two sleeve sections (11,12) located in succession in an axial sense and developed to be eccentric to each other, to be inserted in the meshing area.

9 Claims, 4 Drawing Sheets

5,778,731

RACK-AND-PINION GEAR

BACKGROUND OF THE INVENTION

The invention pertains to a rack-and-pinion gear having a gearbox case, in a drill hole of which is guided a steering rack that makes contact by means of a pinion arranged in a pinion housing area.

Rack-and-pinion gears of this generic class are known. A bearing is required for the steering gear of a rack-and-pinion steering, in particular where the steering rack meshes with the pinion of a power-assisted steering valve. The pinion exerts a radial force on this location of the steering rack, such that the other side of the steering rack that forms the shaft must be counter-supported.

A bearing of this type, known from DE 4,302,309 A1, is in the form of a so-called thrust carrying piece. The housing features a drill hole that is radial to the longitudinal axis of the shaft, with such a drill hole forming a receiver pot. A thrust carrying piece, generally a plastic element, is inserted into this drill hole. On the one hand, the thrust carrying piece is loaded by means of a spring and the housing pot is sealed; on the other hand, the housing pot seal must be impervious to leakage. The working area of the thrust carrying piece encounters the widest range of temperatures. A thrust carrying piece, generally formed of polyoxymethylene, must be inserted with play; on the one hand, this is in order to guarantee heat expansion, especially of the thrust carrying piece and, on the other hand, to compensate the curvature of the steering rack. This required play causes these conventionally known bearings to have a tendency to chatter. Apart from the thrust carrying piece itself, an array of components is required, namely, a spring, a screw cap and an O-ring for sealing; also, the housing must be provided with an additional radial pot.

In order to simplify, in particular, the bearing area of a steering gear of this type, a trough-like or shell-like spring-loaded support piece is proposed in DE-OS 2,657,289, 2,657,290 and 2,934,275. This is inserted, together with the spring, in the counter-bearing area and exerts a counter-pressure on the shaft, or steering rack.

A rack-and-pinion gear having a wedge-shaped pressure element that is in sliding contact with a curved area of the rounded back of the steering rack and which gear encloses the remaining part of the steering rack without contact, and is supported in a pivoted manner in one end of the pinion housing is known from DE-AS 2,409,938, with the conventionally known tubular wedge bearing being locked in the pressure position with the pinion housing by means of crimping. The publication also discloses the fact that the pressure piece is precisely positioned with the use of springs.

One problem with these embodiments involves the radial and axial positioning and localizing of the support elements. In addition, components are used, in turn, that have different levels of heat expansion; parts that are supported against each other likewise have a tendency to chatter, since the spring prestress must not be so great that increased friction, or even jamming, results with heat expansion. With a pressure element such as that known from DE-AS 2,409,938, the overall construction is costly, such that the toothed gearing as a whole is cost intensive.

SUMMARY OF THE INVENTION

Starting from this state of the art, the underlying purpose of the present invention is to specify a rack-and-pinion gear that is economical and simple to construct, does not have a tendency to chatter, and guarantees an improved seal with a simultaneous simplification of the housing construction.

For a technical solution to this problem, a rack-and-pinion gear of this generic class is proposed, where the drill hole is enlarged in an eccentric sense in the area where the pinion and steering rack mesh and a wedge bearing element—substantially in the form of a sleeve, having at least two sleeve sections located in succession in an axial sense and developed to be eccentric to each other—is inserted in the meshing area.

A rack-and-pinion gear in accordance with the invention can be constructed and adjusted very simply, with the wedge bearing element being able to be localized in a fixed sense without additional auxiliary devices. By means of the fact that a sleeve section is arranged in an eccentric enlargement, this area can be localized in an axial sense, such that a turning, as well, is no longer possible. A rack-and-pinion gear in accordance with the invention requires no enlargement of the radial pot, as is known from the state of the art, and no additional spring elements are required. Sealing of the housing is carried out only at conventional locations, e.g., at the axial ends, and the use of a wedge bearing element without springs avoids chatter.

It is proposed, that the at least two sleeve sections, located in succession in an axial sense and formed to be eccentric to each other, feature different diameters. This improves the positioning and localizing of the wedge bearing element in the rack-and-pinion gear.

In accordance with an additional advantageous proposal, the sleeve section having a smaller diameter is longer than the other. The sleeve section having a greater diameter is provided for insertion in the eccentric enlargement of the drill hole, such that the other sleeve section, having a smaller diameter, projects into the drill hole of the housing provided for the steering rack.

In an advantageous way, one of the sleeve sections has a wall thickness that differs over the circumference. This forms a wedge element, substantially in the form of a sickle, such that turning the same enables the steering rack to be braced.

It is further proposed, to advantage, that an axial flute be developed in at least one of the sleeve sections. This flute decreases the supporting surface between the steering rack and wedge bearing element, with inevitable advantages for the gearing dynamics, e.g., the defined contact surfaces with the steering rack, with the aim of an optimal guide mechanism, preferably a so-called dovetail guide.

It is further proposed, to advantage, that lubricant sinks be formed in at least one of the sleeve sections, such that runoff between the steering rack and wedge bearing element is improved.

The wedge-shaped sleeve section is advantageously segmented. This is carried out by means of slotting.

It is particularly advantageous to segment the sleeve sections in such a way that the wedge bearing element is of a multipiece configuration. Thus, for example, a wedge-shaped sleeve section can be inserted in a sleeve element that provides a frame. The individual segment parts can be formed of different materials or can feature elements such that, e.g., at least segment parts are in a spring elastic form.

In a particularly advantageous manner, it is proposed that the sleeve section that projects in the drill hole of the steering rack be of an open design over its full axial length, hence, that it be present only as a channel.

Finally, it is proposed with the invention that the sleeve section that projects in the drill hole of the steering rack be of a spring elastic form.

3

The invention is used to provide a rack-and pinion gear that is simple to construct, easy to mount and seal, adjustable, and requires few components.

BRIEF DESCRIPTION OF THE DRAWING

In the following, an embodiment of the invention is described with the aid of figures. Shown are.

DETAILED DESCRIPTION OF PREFERRED EMBODIMENTS

Figure 1:
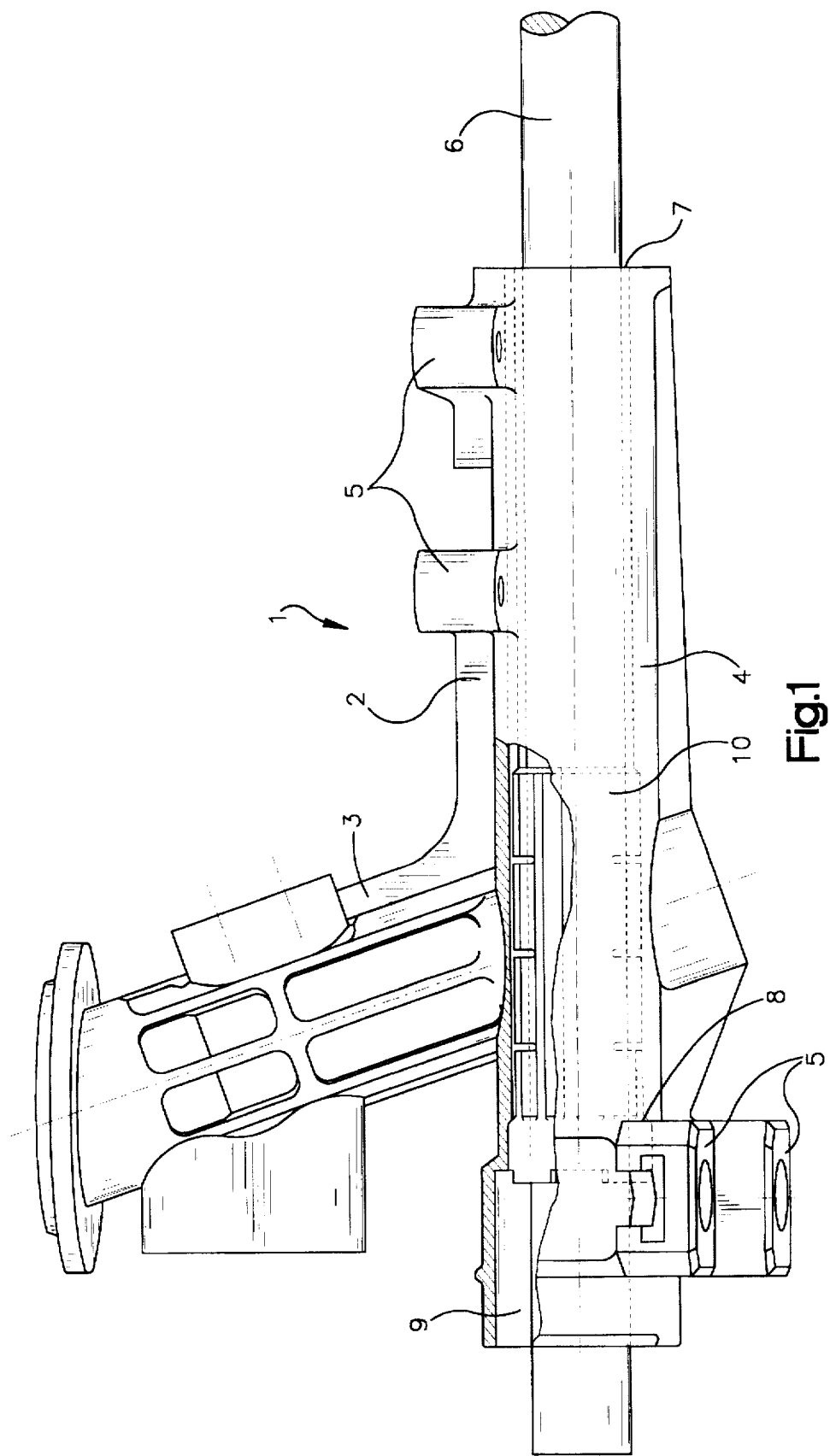
FIG. 1 A schematic side view, in partial section, of one embodiment of a rack-and-pinion gear.
Figure 2:
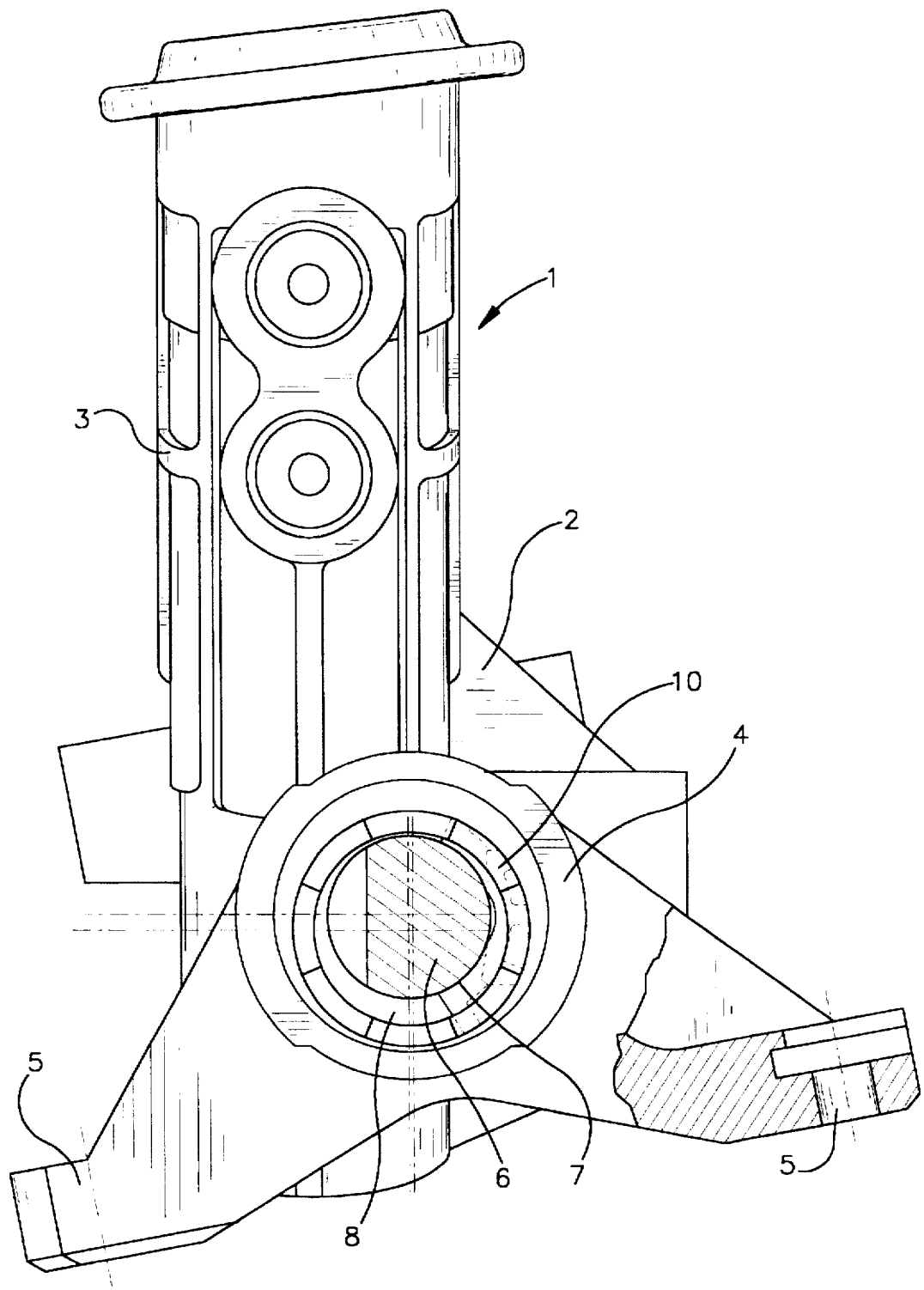
FIG. 2 A view of the gear in accordance with FIG. 1 from the front.

For a rack-and-pinion gear (1) shown in FIGS. 1 and 2, the housing (2) is composed of a pinion housing area (3) and a steering rack housing area (4). The housing features mounting locations (5), e.g., in order to be mounted to a vehicle. A steering rack (6) is guided in the steering rack housing area (4) and projects out from both sides of the rack-and-pinion gear (1), e.g., in order to be connected here to control rods of a vehicle steering mechanism. The free end of the pinion is connected to a steering rod. In this respect, the embodiment described is state of the art. The steering rack (6) runs into a drill hole (7) in the steering rack housing area (4). One side of the drill hole (7) features an eccentric enlargement. In this connection, this is a matter of a drill hole, executed in an eccentric sense to the longitudinal center axis of the drill hole (7), and having a diameter that is increased in comparison to the diameter of the drill hole (7). A closure (9) is developed at this housing side end, such that this side of the housing can be sealed to be hydraulically impervious and protected against dirt.

A wedge bearing element (10) is inserted in the drill holes (7,8), such an element at least partially encloses the steering rack.

FIGS. 3–7 show, in detail, one embodiment for a wedge bearing element (10). This comprises a first sleeve section (11) and a second sleeve section (12). The second sleeve section (12) has a diameter that is decreased in comparison with the sleeve section (11) and both sleeve sections (11,12) are positioned in an eccentric sense to each other. The sleeve section (12), which is pushed into the drill hole (7), is composed of segments (13) formed through the generation of transverse slots (14). Openings (15) are formed within the segments in order to improve the sliding properties and in order to guide the lubricant.

The free end of the sleeve section (11) features an end ring (16), consisting of crenellate partial elements, such that the wedge bearing element (10) can rotate about the center axis.

4

Figure 4:
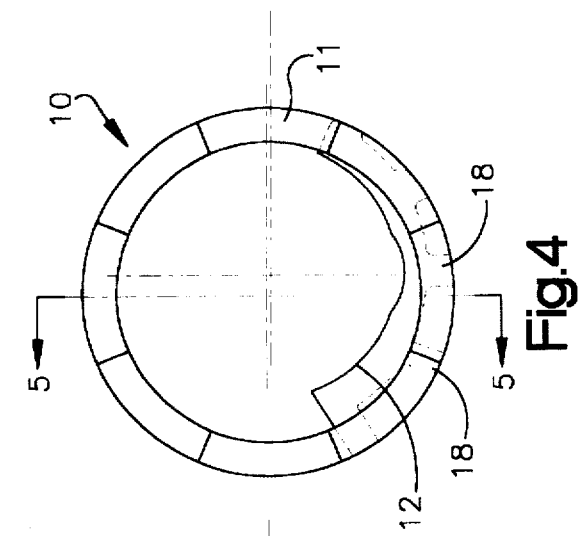
FIG. 4 A side view of the bearing element in accordance with FIG. 3.
Figure 3:
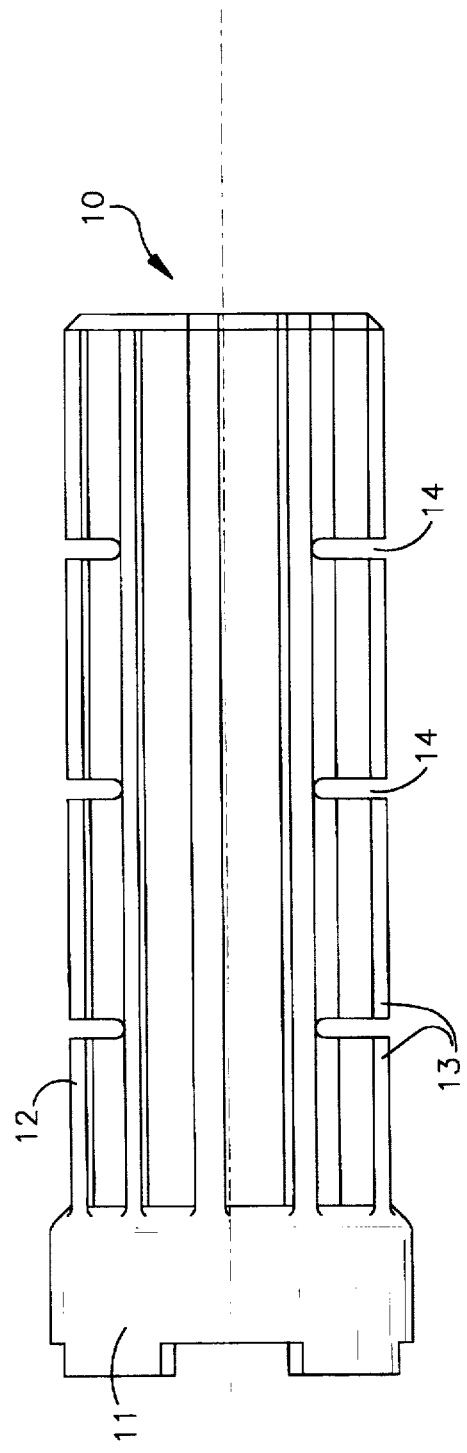
FIG. 3 A side view of one embodiment for a bearing element.
Figure 5:
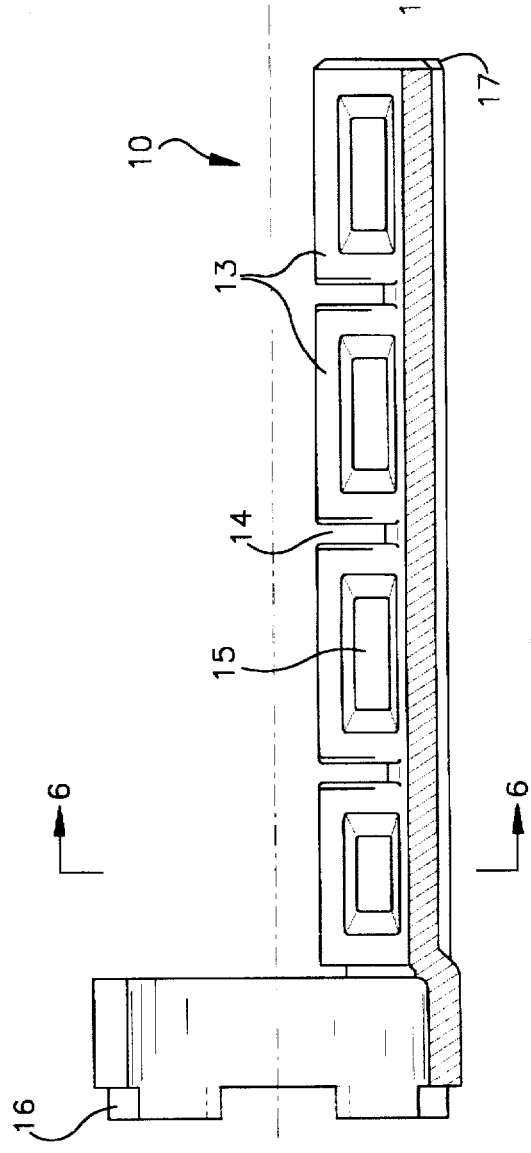
FIG. 5 A side view along line 5—5 in FIG. 4.
Figure 6A:
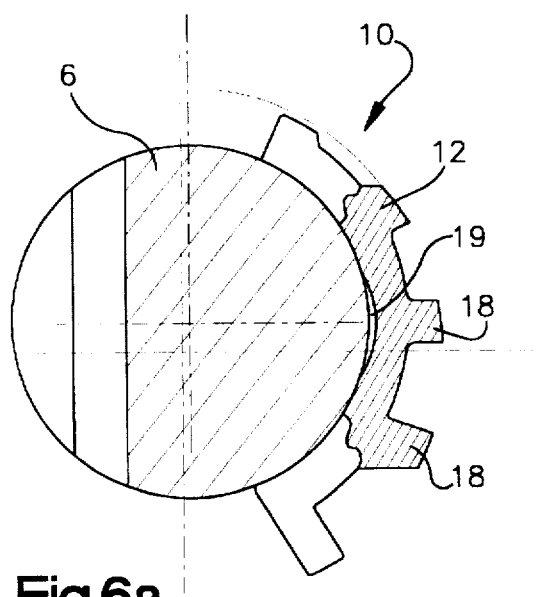
FIG. 6a and FIG. 6b A side view along line 6—6 in accordance with FIG. 5 with the steering rack.
Figure 6B:
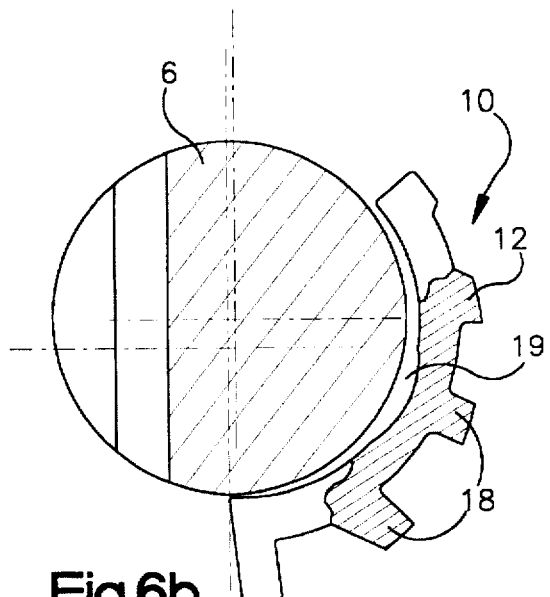

As FIGS. 4 and 6 show, ribs (18) are developed on the sleeve section (12). The edge of the free end of this sleeve section features a chamfer (17) and the height of said ribs increases over the circumference. Consequently, by turning the wedge bearing element (10), the steering rack resting in the sleeve section (12) is loaded or relieved. This process is shown in FIGS. 6a and 6b, with FIG. 6a showing the braced position while FIG. 6b shows the assembly position. The figures show, in addition, that the sleeve section (12) is developed as a channel, open in an axial sense, and for its part features an axial flute (19), worked out of the inner wall, parallel to the longitudinal center line.

Figure 7:
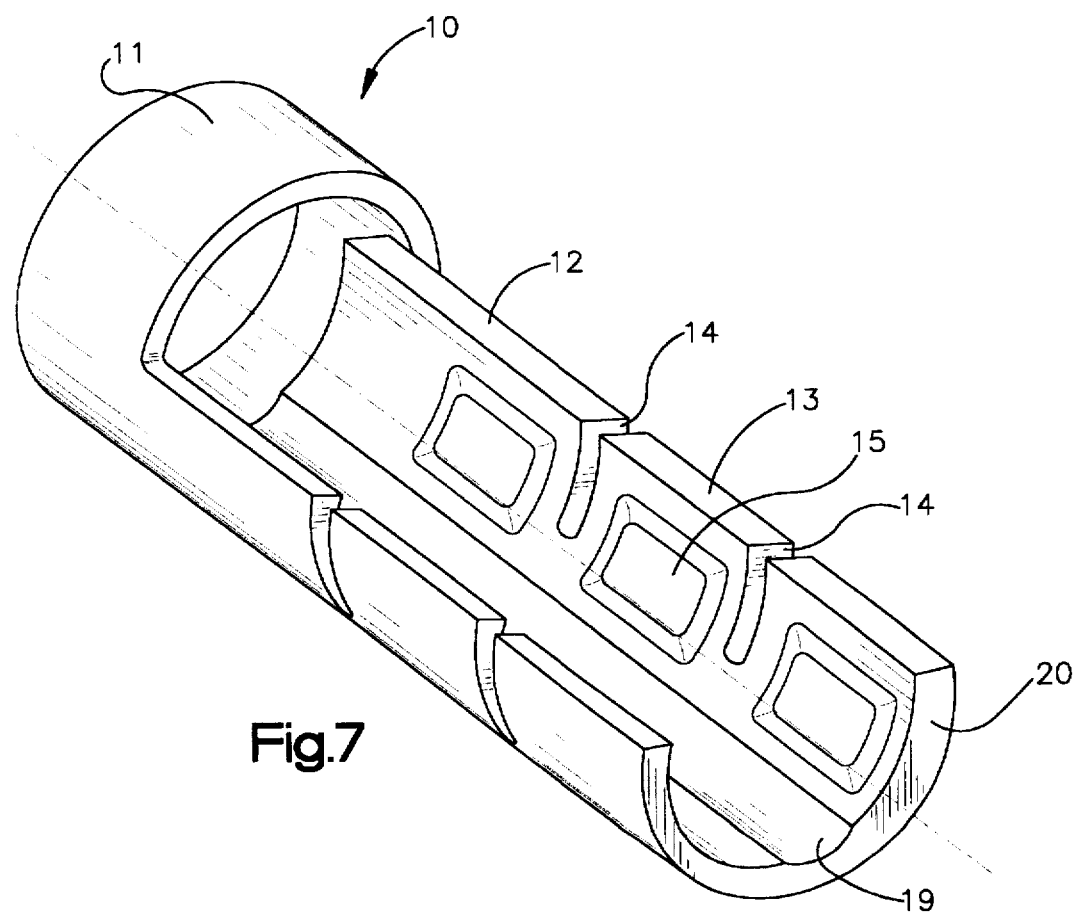
FIG. 7 A perspective view of the wedge bearing element in accordance with FIG. 3 with features omitted for clarity.

It is particularly evident from FIG. 7 that in the area of the end (20), the sleeve section (12) features a wall thickness that increases over the circumference.

It is essential, for the present invention, that the contact surfaces feature a limited coefficient of friction. Moreover, the material selection for the wedge bearing element is dependent only on the boundary conditions of the working area. Thus, a wedge bearing element can be formed, e.g., entirely of plastic, or it can also be an aluminum sleeve, the contact surfaces of which are provided with a decreased-friction coating.

As shown in FIGS. 1 and 2, the wedge bearing element shown is pushed into the housing (2) of a rack-and-pinion gear (1) and is adjusted by means of turning, such that the steering rack is optimally supported against the pinion, and fixed in this position by means of putting on a closure, e.g., axial press-ins in the drill hole (8).

List of reference numerals

1 Rack-and-pinion gear
2 Housing
3 Pinion housing area
4 Steering rack housing area
5 Mounting locations
6 Steering rack
7 Drill hole
8 Eccentric enlargement
9 Closure
10 Wedge bearing element
11 Sleeve section
12 Sleeve section
13 Segments
14 Slots
15 Opening
16 End ring
17 Chamfer
18 Ribs
19 Flute
20 End Having described the invention, the following is claimed:

1. A rack and pinion steering mechanism comprising:

a rack centered on a rack axis and having rack teeth;

a pinion having teeth meshingly engaged with said rack teeth on said rack;

a housing enclosing said rack and said pinion, said housing having an axially extending passage, said passage having a first portion centered on said rack axis and a second portion centered on an eccentric axis offset from said rack axis, said second portion of said passage having a larger diameter than said first portion of said passage, said rack teeth on said rack and said teeth on said pinion being meshingly engaged in said first portion of said passage; and a bearing element disposed in said passage in said housing and encircling said rack, said bearing element including a first sleeve section centered on said eccentric axis and a second sleeve section extending axially from said first sleeve section, said first sleeve section having a ring-shaped cross-section located in said second portion of said passage and said second sleeve section having a wedge-shaped cross-section extending circumferentially around a portion of said rack, said second sleeve section being disposed in said first portion of said passage.

2. The rack and pinion steering mechanism of claim 1 wherein said first and second sleeve sections have different diameters.

3. The rack and pinion steering mechanism of claim 2 wherein said second sleeve section has a smaller diameter than said first sleeve section.

4. The rack and pinion steering mechanism of claim 1 wherein said second sleeve section of said bearing element is axially longer than said first sleeve section.

5. The rack and pinion steering mechanism of claim 1 wherein one of said sleeve sections has a flute extending axially along said one of said sleeve sections.

6. The rack and pinion steering mechanism of claim 1 wherein one of said sleeve sections includes lubricant sinks.

7. The rack and pinion steering mechanism of claim 1 wherein one of said sleeve sections includes a plurality of segments.

8. The rack and pinion steering mechanism of claim 7 wherein said plurality of segments are formed by a plurality of circumferentially extending slots.

9. The rack and pinion steering mechanism of claim 1 wherein said second sleeve section extends only partially around the circumference of said rack.

* * * * *